Feb. 21, 1967  SHIGEYOSHI NAGATA  3,305,167
TOOTH PROFILES OF NON-PULSATING, ROTARY PISTONS WHICH ARE
NON-CIRCULAR, SPUR-TOOTHED AND PROVIDED
WITH NON-CIRCULAR GEARS
Filed Aug. 26, 1965  2 Sheets-Sheet 1

INVENTOR.
SHIGEYOSHI NAGATA
BY
McGlew and Toren
ATTORNEYS

Feb. 21, 1967  SHIGEYOSHI NAGATA  3,305,167
TOOTH PROFILES OF NON-PULSATING, ROTARY PISTONS WHICH ARE
NON-CIRCULAR, SPUR-TOOTHED AND PROVIDED
WITH NON-CIRCULAR GEARS
Filed Aug. 26, 1965                                    2 Sheets-Sheet 2

INVENTOR.
SHIGEYOSHI NAGATA
BY
McGlew and Toren
ATTORNEYS

United States Patent Office 3,305,167
Patented Feb. 21, 1967

3,305,167
TOOTH PROFILES OF NON-PULSATING, ROTARY PISTONS WHICH ARE NON-CIRCULAR, SPUR-TOOTHED AND PROVIDED WITH NON-CIRCULAR GEARS
Shigeyoshi Nagata, 3559 3-chome, Mejiro-machi, Toshima-ku, Tokyo, Japan
Filed Aug. 26, 1965, Ser. No. 482,711
Claims priority, application Japan, Dec. 4, 1964, 39/67,923
5 Claims. (Cl. 230—141)

This invention relates to rotary pumps of the type having interengaging non-circular rotors driven conjointly by intermeshing gears. More particularly, the present invention relates to an improved rotary pump of this type involving a novel formation of the pitch lines or rolling curves of the intermeshing non-circular pump driving gears whereby a non-pulsating flow of fluid is obtained.

It is known that Roote-type rotors and gears having the usual circular spur-gears of an involute or cycloid tooth-form cause pulsation of the discharge flow due to the uniform angular velocity. Various arrangements have been proposed to prevent such pulsations in the discharge flow. For example, in the case of Roote-type machines, two pairs of rotor which are phase-displaced with respect to each other have been provided, and also helical gears having a single point continuous contact-type of tooth formation have been used. The disadvantage of these known expedients is that the manufacture of such gears is very difficult, and the discharge rate per r.p.m. is less than that of a pump incorporating non-circular driving gears, such as oval gears.

The idea is to provide a rotary pump including non-circular rotors driven by non-circular intermeshing gears and in which uniform discharge, without pulsation, can be obtained. However, by the very nature of such pumps, severe pulsations in the discharge occur. Usually, to prevent or smooth the pulsation of the discharge, one or more additional sets of non-circular rotors driven by non-circular gears have to be provided.

An object of the present invention is to provide tooth pitch lines or rolling curves of non-circular gears driving non-circular rotors, and which do not cause any pulsation in the discharge of a rotary pump. Such pulsation is theoretically inevitable in the case of circular spur-gears driving non-circular rotary pump rotors, so that it would seem to be inconsistent that such provision is possible while being impossible in the case of circular spur gears rotating at uniform angular velocities. Nevertheless, according to the present invention such tooth pitch lines or rolling curves are obtained, based on the theory of non-circular gears.

For an understanding of the principles of the invention, reference is made to the following description of typical embodiments thereof as illustrated in the accompanying drawings.

FIG. 1 is a somewhat diagrammatic illustration of one embodiment of the present invention in which gears having tooth pitch lines or rolling curves determined in accordance with the invention are used to drive non-circular rotors of a rotary pump;

FIGS. 2A and 2B diagrammatically illustrate the development of the tooth pitch lines or rolling curves of gears in accordance with the invention;

Figure 1:
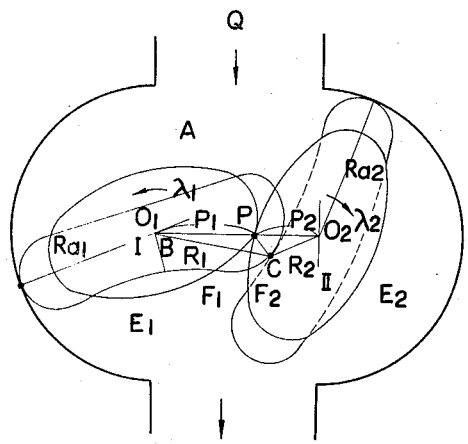

Referring to FIG. 1, a variation of flow rate Q can be determined by a change of area A due to rotations of rotors I and II. Therefore the following relation between an infinitely small portion $dA$, respectively, of area A and angles of rotations $\lambda_1$, $\lambda_2$ of rotors I, II is given:

$$2dA = (R_{a1}^2 - R_1^2)d\lambda_1 + (R_{a2}^2 - R_2^2)d\lambda_2 \quad (1)$$

where $R_1$ and $R_2$ are radius vectors to the point of tangency of the rotors, and $R_{a1}$ and $R_{a2}$ are halves of the maximum diameters of the rotors, respectively.

If profiles $F_1$, $F_2$ of rotors I, II are in contact at a point of tangency C, and a common normal CP to the curves of the rotor profiles at C intersects the centre line $\overline{O_1O_2}$ connecting the rotor axes at a point P, then the point P coincides with the pitch point or rolling curve of the driving gears, and therefore it follows that $$\rho_1 d\lambda_1 = \rho_2 d\lambda_2$$

where $$\overline{O_1P} = \rho_1, \overline{O_2P} = \rho_2$$

It will be seen that $\rho_1$, $\rho_2$, are radii of the respective curves $E_1$ and $E_2$ of the driving gears.

Refering to Equation 1, in order to obtain a non-pulsating discharge flow, the value of $dA/d\lambda$ must be constant, and therefore, if divided by $d\lambda_1$, it follows that $$2dA/d\lambda_1 = R_{a1}^2 - R_1^2 + (R_{a2}^2 - R_2^2)d\lambda_2/d\lambda_1 = \text{constant} \quad (1')$$

If the minimum value of $R_1$ is equal to B, and correspondingly the maximum value of $R_2$ is equal to $R_{a2}$, then, substituting for $R_1$ and $R_2$ their boundary values B and $R_{a2}$, respectively, the value of constant is given, $$R_{a1}^2 - B^2 = \text{constant}$$

Therefore substituting for constant at its value $R_{a1}^2 - B^2$, $$(R_1^2 - B^2)d\lambda_1 = (R_{a2}^2 - R_2^2)d\lambda_2 \quad (2)$$

or $$(R_1^2 - B^2)\rho_2 = (R_{a2}^2 - R_2^2)\rho_1 \quad (2')$$

Figure 2A:
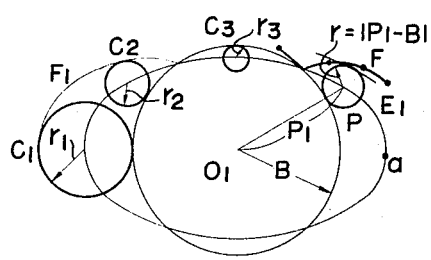
Figure 2B:
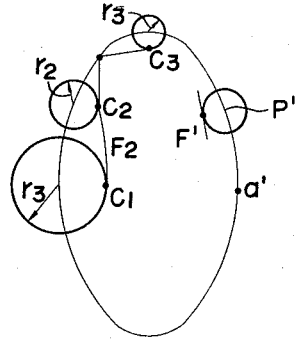

Equation 2 shows the condition for a non-pulsating flow. A rotor profile satisfying this condition provides a non-pulsating discharge. Considered from the geometrical standpoint, the condition set forth in Equation 2 means that the above-mentionded point C is a point on the circumference of a circle having, as a center, the point P and having a radius equal to $|\rho_1 - B|$. Consequently, referring to FIGS. 2A and 2B, in which pitch (rolling) curves $E_1$, $E_2$ of two non-circular gears are shown, if P is a given point on the pitch curve $E_1$, then a rotor profile $F_1$ is obtained which is the envelope of a series of circles each of which has, as a center, the point P, and a radius $|\rho_1 - B|$. A rotor profile $F_2$ which is in continuous contact with the rotor profile $F_1$ is likewise obtained as the envelope of a series of circles each of which has, as a center, the point P' which is a point on the pitch or rolling curve $E_2$, and each of which has a radius $r$ equal to $|\rho_1 - B|$.

Figure 3A:
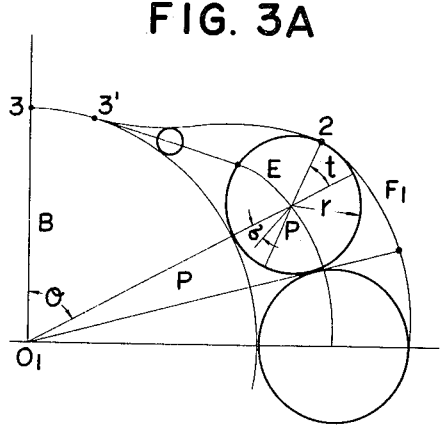
FIGS. 3A and 3B are diagrammatic illustrations, similar to FIGS. 2A and 2B, illustrating the tooth pitch line or rolling curve development for a practical embodiment of the invention.
Figure 3B:
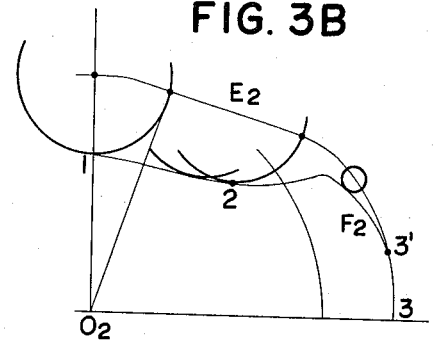

FIGS. 3A and 3B show a practical embodiment, which is a special case in which $\rho_1$ is equal to B, namely $r=0$, when between points 3 and 3' of the pitch curve E. From the drawings it will be seen that $\rho = \rho(\theta)$, $\tan \delta = d\rho/d\theta/\rho$ and $t = 2\delta$.

Figure 4:
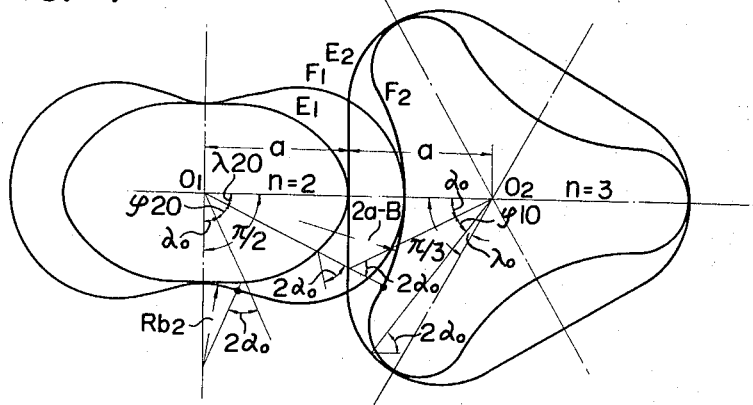
FIG. 4 is a view similar to FIG. 1, illustrating another embodiment of the invention.

In FIG. 4, a combination of a two-lobed driving gear and a three-lobed driving gear is shown. In this case, the maximum diameters of each of a pair of rotors are the same. The driving gear pitch (rolling) curves are denoted by $E_1$ and $E_2$, while the rotor profiles are denoted by $F_1$ and $F_2$.

Figure 5:
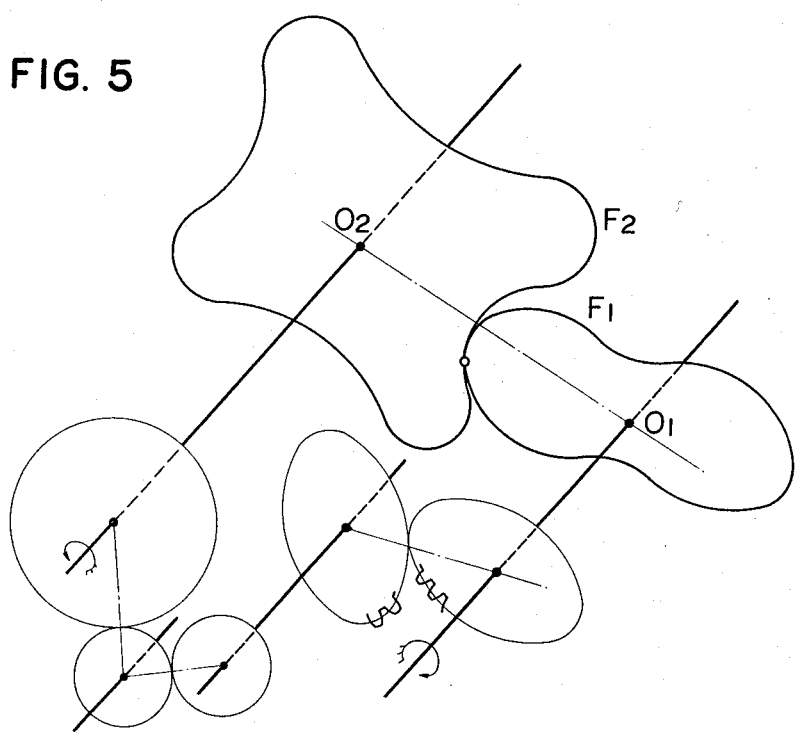
FIG. 5 illustrates an arrangement, embodying the invention, in which one of the gears driving a rotor is circular and the gear driving the other rotor is non-circular.

FIG. 5 shows an embodiment of the invention in which one rotor, having the axis $O_2$, is driven by a circular gear and the other rotor, having the axis $O_1$, is driven by a non-circular gear. A gear train, including a pair of circular gears and a pair of non-circular gears, interconnects the two axes $O_2$ and $O_1$, and the two directly intermeshing non-circular gears have tooth profiles or rolling curves determined in accordance with the principles of the invention.

While specific embodiments of the invention have been shown and described in detail to illustrate the application of the principles of the invention, it will be understood that the invention may be embodied otherwise without departing from such principles.

What I claim is:

1. A rotary fluid machine comprising at least a pair of rotatable non-circular rotors in continuous rolling engagement with each other; and a gear train interconnecting said rotors for conjoint rotation and including a pair of intermeshing gears having a common tooth pitch rolling curve satisfying the conditon of equality between the product of the radius, to the point of tangency, of one gear and a function of the maximum radius of the rotor driven by the other gear, and the product of the radius, to the point of tangency, of such other gear and a function of the maximum radius of the rotor driven by such one gear.

2. A rotary fluid machine, as claimed in claim 1, in which said common tooth pitch rolling curve satisfies the condition that:

$$(R_1{}^2 - B^2)\rho_2 = (R_{a2} - R_2{}^2)\rho_1$$

where $R_1$ is a radius vector of one rotor, the minimum value of which is B, while $R_2$ is a radius vector of the other rotor, a half of the maximum diameter of which is $R_{a2}$, and $\rho_1$ and $\rho_2$ are the respective distances from the axes of the two gears to the point of common tangency thereof, the distances lying on a rectilinear line joining the axes of the two gears.

3. A rotary fluid machine, as claimed in claim 2, in which the profiles of said rotors are the envelopes of circles each having a center at the point of tangency of said gears and a radius equal to the difference between the radius to the point of tangency of the associated driving gear and the minimum radius of the respective rotor.

4. A rotary fluid machine, as claimed in claim 2, in which one of said rotors is a two-lobe rotor and the other of said rotors is a three-lobe rotor.

5. A rotary fluid machine, as claimed in claim 2, in which one of said rotors is a four-lobe rotor and the other of said rotors is a two-lobe rotor; said gear train rotating said four-lobe rotor at a uniform angular velocity.

References Cited by the Examiner

UNITED STATES PATENTS

| | | | |
|---|---|---|---|
| 298,952 | 5/1884 | Donkin | 103—126 |
| 571,770 | 11/1896 | Kurz | 230—141 |
| 1,837,714 | 12/1931 | Jaworowski | 103—126 |
| 2,368,019 | 1/1945 | Guibert et al. | 103—126 |
| 2,671,929 | 3/1954 | Gayler | 230—141 |

FOREIGN PATENTS

| | | |
|---|---|---|
| 14,263 | 1887 | Great Britain. |
| 282,752 | 5/1928 | Great Britain. |

DONLEY J. STOCKING, *Primary Examiner.*

W. J. GOODLIN, *Assistant Examiner.*